(12) United States Patent
Park et al.

(10) Patent No.: US 12,498,375 B2
(45) Date of Patent: Dec. 16, 2025

(54) WATER-SOLUBLE COMPOUND FOR DETECTION OF BETA-AMYLOID

(71) Applicant: KOREA ATOMIC ENERGY RESEARCH INSTITUTE, Daejeon (KR)

(72) Inventors: Yong Dae Park, Jeongeup-si (KR); Jong Ho Jeon, Daegu (KR); Min Ho Joe, Jeongeup-si (KR); Dong Eun Lee, Jeonju-si (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 933 days.

(21) Appl. No.: 17/520,972

(22) Filed: Nov. 8, 2021

(65) Prior Publication Data
US 2022/0155310 A1 May 19, 2022

(30) Foreign Application Priority Data
Nov. 19, 2020 (KR) .................. 10-2020-0155306

(51) Int. Cl.
| | | |
|---|---|---|
| G01N 33/68 | (2006.01) | |
| C07D 209/60 | (2006.01) | |
| C07D 409/06 | (2006.01) | |
| C07D 409/14 | (2006.01) | |
| G01N 33/58 | (2006.01) | |

(52) U.S. Cl.
CPC ......... *G01N 33/582* (2013.01); *C07D 209/60* (2013.01); *C07D 409/06* (2013.01); *C07D 409/14* (2013.01); *G01N 33/6896* (2013.01)

(58) Field of Classification Search
None
See application file for complete search history.

(56) References Cited

U.S. PATENT DOCUMENTS

| | | | |
|---|---|---|---|
| 3,384,487 A | 5/1968 | Heseltine et al. | |
| 6,329,531 B1 | 12/2001 | Turner et al. | |
| 9,551,722 B2 | 1/2017 | Yang et al. | |
| 2006/0016825 A1 | 1/2006 | Kudo et al. | |
| 2014/0213614 A1 | 7/2014 | Guo et al. | |
| 2017/0130050 A1 | 5/2017 | Kundu et al. | |
| 2018/0215621 A1 | 8/2018 | Desmet | |
| 2019/0375941 A1 | 12/2019 | Gulyani et al. | |

FOREIGN PATENT DOCUMENTS

| | | |
|---|---|---|
| BE | 668962 | 12/1965 |
| CN | 1237911 | 12/1999 |
| CN | 1867552 | 11/2006 |
| CN | 107922194 | 4/2018 |
| KR | 20040029093 | 4/2004 |
| KR | 20040058111 | 7/2004 |
| KR | 101282885 | 7/2013 |
| KR | 20140049370 | 4/2014 |
| KR | 20150002110 | 1/2015 |
| KR | 20160049819 | 5/2016 |
| KR | 20170001045 | 1/2017 |
| KR | 20170011148 | 2/2017 |
| KR | 20170016481 | 2/2017 |
| KR | 101802672 | 11/2017 |
| KR | 20180022399 | 3/2018 |
| KR | 20200107658 | 9/2020 |

OTHER PUBLICATIONS

Definition of "detect" from www.collinsdictioanry.com, accessed Jan. 8, 2025 (Year: 2025).*
Product page for β-Amyloid (1-42), human from www.genscript.com, accessed Jan. 8, 2025 (Year: 2025).*
Wei Zhu et al., "Zwitterionic AIEgens: Rational Molecular Design for NIR-II Fluorescence Imaging-Guided Synergistic Phototherapy", Advanced Functional Materials, vol. 31, No. 3, Oct. 6, 2020, pp. 1-11, DOI: 10.1002/adfm.202007026.
Hongwu Liu et al., "Targeting β-amyloid plaques and oligomers: development of near-IR fluorescence imaging probes", Future Med. Chem.vol.9, No. 2, Feb. 1, 2017, pp. 179-198.
EPO, Search Report of EP 21208801.7 dated Apr. 12, 2022.
Ming-ming Xu et al., "Advances in development of fluorescent probes for detecting amyloid-β aggregates", Acta Pharmacologica Sinica, Jun. 2016;37(6):719-30. doi: 10.1038/aps.2015.155. Epub Mar. 21, 2016.
Hongda Li et al., "Rapidly responsive and highly selective fluorescent probe for sulfite detection in real samples and living cells", Analytica Chimica Acta, vol. 897, Oct. 15, 2015, pp. 102-108.
Yusif Issahak Gyasi et al., "Biological applications of near infrared fluorescence dye probes in monitoring Alzheimer's disease", European Journal of Medicinal Chemistry, vol. 187, Feb. 1, 2020, 111982.
Samuel Achilefu et al., "Novel fluorescent contrast agents for optical imaging of in vivo tumors based on a receptor-targeted dye-peptide conjugate platform", Journal of Biomedical Optics, 6, 327-334, (2001).
Jin Yang et al., "Novel Tumor-Specific and Mitochondria-Targeted near-Infrared-Emission Fluorescent Probe for SO2 Derivatives in Living Cells", ACS Sensors, 2016, vol. 1, pp. 166-172, Nov. 30, 2015.
Wei Fu et al., "Rational Design of Near-Infrared Aggregation-Induced-Emission-Active Probes: In Situ Mapping of Amyloid-β Plaques with Ultrasensitivity and High-Fidelity", J. Am. Chem. Soc. 2019, vol. 141, pp. 3171-3177, Jan. 11. 2019.
Ge Yiran et al., "Advances of near-infrared fluorescent probes for detection of Alzheimer's disease", Journal of China Pharmaceutical University, 2020, vol. 51, No. 2, pp. 138-151, Apr. 24, 2020 English abstract only.

(Continued)

*Primary Examiner* — Nissa M Westerberg
(74) *Attorney, Agent, or Firm* — LEX IP MEISTER, PLLC

(57) ABSTRACT

The present invention relates to a water-soluble compound for the detection of beta-amyloid, and a production method thereof. The compound according to the present invention has excellent water-soluble properties, and thus can provide a water-soluble formulation for the detection of beta-amyloid. Accordingly, there is an effect that the compound can be useful as a composition for the detection of beta-amyloid through retinal imaging.

8 Claims, 4 Drawing Sheets

(56) References Cited

OTHER PUBLICATIONS

CAS No. 6762-13-6, Nov. 16, 1984, total 1 page.
CAS No. 1166832-96-7, Jul. 22, 2009, total 1 page.

* cited by examiner

WATER-SOLUBLE COMPOUND FOR DETECTION OF BETA-AMYLOID

CROSS-REFERENCE TO RELATED APPLICATIONS

This application claims the benefit of Korean Patent Application No. 10-2020-0155306 filed on Nov. 19, 2020, in the Korean Intellectual Property Office, the disclosure of which is incorporated herein in its entirety by reference.

TECHNICAL FIELD

The present invention relates to a compound for the detection of beta-amyloid, and a production method thereof. Specifically, the present invention relates to a water-soluble imaging agent and a production method thereof.

BACKGROUND ART

With the development of modern medicine, the population of elderly people around the world is increasing, and accordingly, the number of patients with dementia, which is a geriatric disease, is also rapidly increasing. Alzheimer's disease is the most common form of dementia, and is a progressive neurodegenerative disorder indicated by memory loss, cognition and behavioral instability. The cause of the disease has not yet been clearly known, but as a result of analyzing postmortem brain tissues of patients, accumulation of amyloid plaques composed of beta-amyloid (Aβ) peptides between nerve cells and neurofibrillary tangles formed by hyperphosphorylated tau protein filaments in nerve cells has been reported.

39 to 43 amino acids including an Aβ peptide are derived from the larger amyloid precursor protein (APP). In the amyloidogenic pathway, the Aβ peptide is cleaved from the APP due to sequential proteolysis by β- and γ-secretases. The Aβ peptide is liberated as a soluble protein, and can be detected at a low level in the cerebrospinal fluid (CSF) in a normal aged brain. It is known that during the progression of Alzheimer's disease, Aβ peptides aggregate to form amyloid deposits in the brain or blood vessels. Moreover, the amyloid deposits are also known to play a certain role in amyloidosis which is a disease caused by abnormal deposition of amyloid proteins in different organs and/or tissues.

Accordingly, for the diagnosis of diseases that can be diagnosed by quantitatively detecting amyloid aggregates, including Alzheimer's disease, many compounds with fluorescence that bind well to beta-amyloid aggregates and easily indicate the presence thereof have been studied.

Among Alzheimer's disease diagnostic agents developed in the related art, a positron emission tomography (PET) imaging agent and an optical imaging agent, which are for the detection of beta-amyloid, occupy the majority.

As a technique for detecting beta-amyloid, which is known as a protein causing Alzheimer's disease, attempts to detect beta-amyloid in the retina of the eye have recently been continuing in a brain image-based technique in the related art. For example, in the United States, clinical trials for the diagnosis of Alzheimer's disease through retinal imaging are ongoing.

For retinal imaging, it is most efficient to develop a beta-amyloid diagnostic agent in the form of an injection and then inject the diagnostic agent into a blood vessel. However, existing diagnostic agents for the detection of beta-amyloid are designed for the purpose of penetrating the blood brain barrier (BBB), and are thus designed to retain fat-soluble characteristics. Due to these features, when existing diagnostic agents are used, there is a difficulty in producing a water-soluble injection for the detection and diagnosis of beta-amyloid through retinal imaging.

Therefore, it is necessary to develop novel beta-amyloid diagnostic agents that can be used in the production of a water-soluble injection for the detection and diagnosis of beta-amyloid through retinal imaging.

DISCLOSURE OF THE INVENTION

Technical Problem

An object of the present invention is to provide a compound for the detection of beta-amyloid, and a production method thereof.

Specifically, the object of the present invention is to provide a compound, which is for the detection of beta-amyloid and can be used for a water-soluble injection, and a production method thereof.

Moreover, another object of the present invention is to provide a method for detecting beta-amyloid using a water-soluble compound for the detection of beta-amyloid.

Technical Solution

In order to achieve the above objects, the present invention provides a compound represented by Chemical Formula 1 or a pharmaceutically acceptable salt thereof.

[Chemical Formula 1]

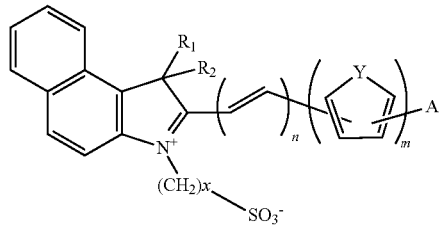

In Chemical Formula 1,
Y is S or O,
A is a functional group derived from an aminoaryl-based compound,
$R_1$ and $R_2$ are each independently hydrogen or a $C_1$ to $C_{10}$ alkyl group,
x is an integer of 1 to 10, and
n and m are each independently an integer of 0 or greater, and n+m≥1.

Moreover, the present invention provides a composition for the detection of beta-amyloid, the composition containing the aforementioned compound or a pharmaceutically acceptable salt thereof.

Furthermore, the present invention provides a method for detecting beta-amyloid, the method including: mixing the aforementioned compound or a pharmaceutically acceptable salt thereof with a sample containing beta-amyloid; and measuring a fluorescence signal for the beta-amyloid.

Advantageous Effects

The compound according to the present invention has an excellent selective binding ability to beta-amyloid, and is thus effective in detecting beta-amyloid through PET imaging, optical imaging, and/or PET-MRI fusion imaging methods. Accordingly, the compound can be useful as a composition for the detection of beta-amyloid and the diagnosis of a disease caused by beta-amyloid overproduction.

In particular, the compound according to the present invention has excellent water-soluble properties, and thus can provide a water-soluble formulation for the detection of beta-amyloid. Accordingly, the compound can be useful as a composition for the detection of beta-amyloid through retinal imaging.

BRIEF DESCRIPTION OF THE DRAWINGS

The following drawings attached to the present specification illustrate preferred embodiments of the present invention, and serve to further understand the technical idea of the present invention together with the aforementioned contents of the present invention, and thus the present invention should not be interpreted as being limited only to the matter illustrated in these drawings.

BEST MODE FOR CARRYING OUT THE INVENTION

Figure 1:
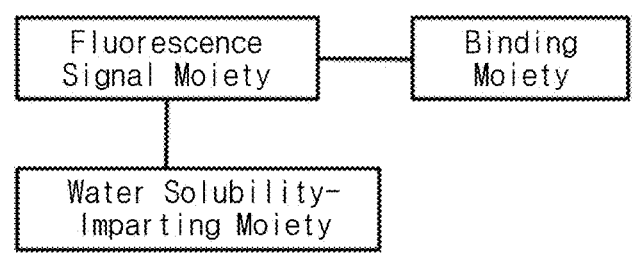
FIG. 1 illustrates the feature of the chemical structure of Chemical Formula 1 of the present invention.

As shown in FIG. 1, the compound according to the present invention has a structural feature of including a fluorescence signal moiety, and a beta-amyloid-binding moiety and a water solubility-imparting moiety, which are bound to the fluorescence signal moiety. In particular, when the compound according to the present invention is formulated into a water-soluble composition, the stability of the composition can be ensured by including the water solubility-imparting moiety. Moreover, the water-soluble composition using the compound can have a feature that the composition can be used as a retinal imaging agent.

Hereinafter, the present invention will be described in detail.

The present invention provides a compound represented by Chemical Formula 1 or a pharmaceutically acceptable salt thereof.

[Chemical Formula 1]

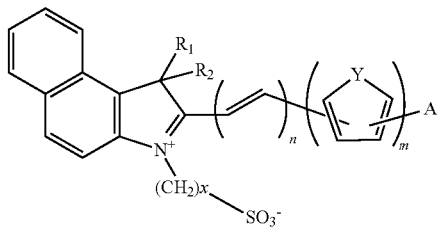

In Chemical Formula 1,

Y is S or O,

A is a functional group derived from an aminoaryl-based compound, $R_1$ and $R_2$ are each independently hydrogen or a $C_1$ to $C_{10}$ alkyl group, x is an integer of 1 to 10, and n and m are each independently an integer of 0 or greater, and n+m≥1.

In one embodiment, Y is S.

In another embodiment, Y is O.

In one embodiment, the aminoaryl-based compound may be at least one selected from the group consisting of aniline, phenylpiperazine, and derivatives thereof.

Specifically, the aminoaryl-based compound may be N-substituted aniline or N,N-substituted aniline. Here, the substituents at the N position of the aniline may be each independently selected from among $C_1$ to $C_6$ linear, branched, and cyclic saturated aliphatic hydrocarbon groups and $C_1$ to $C_6$ unsaturated aliphatic hydrocarbon groups, and may be, for example, each independently selected from among methyl, ethyl, n-propyl, iso-propyl, n-butyl, sec-butyl, tert-butyl, iso-butyl, n-pentyl, iso-pentyl, tert-pentyl, n-hexyl, vinyl, allyl, propenyl, butenyl, pentenyl, hexenyl, hexadienyl, iso-propenyl, iso-hexenyl, cyclohexenyl, cyclopentadienyl, ethynyl, propynyl, pentynyl, hexynyl, iso-hexynyl, cyclohexynyl, cyclopentyl, and cyclohexyl groups.

More specifically, the aminoaryl-based compound may be N-methylaniline or N,N-dimethylaniline.

In another embodiment, $R_1$ and $R_2$ may be each independently a $C_1$ to $C_{10}$ alkyl group.

Specifically, $R_1$ and $R_2$ may be each independently a $C_1$ to $C_6$ alkyl group, or a $C_1$ to $C_3$ alkyl group.

More specifically, $R_1$ and $R_2$ may be each a methyl group.

In another embodiment, x may be an integer of 1 to 9, an integer of 1 to 8, an integer of 1 to 7, an integer of 1 to 6, an integer of 1 to 5, an integer of 2 to 6, or an integer of 3 to 5.

Specifically, x may be 4.

In another embodiment, n and m may be each independently an integer of 0 to 10.

Specifically, n and m may be each independently an integer of 0 to 9, an integer of 0 to 8, an integer of 0 to 7, an integer of 0 to 6, an integer of 0 to 5, an integer of 0 to 4, an integer of 0 to 3, or an integer of 0 to 2.

More specifically, within a range satisfying n+m≥1, each independently, n may be an integer of 0 or 1 and m may be an integer of 0, 1, or 2.

According to one embodiment, the chemical structural formulae of compounds, which can be mentioned as examples of the compound represented by Chemical Formula 1, are summarized in Table 1 below.

TABLE 1

| Compound | Chemical structural formula |
|---|---|
| 1 | [Chemical Formula 2]<br>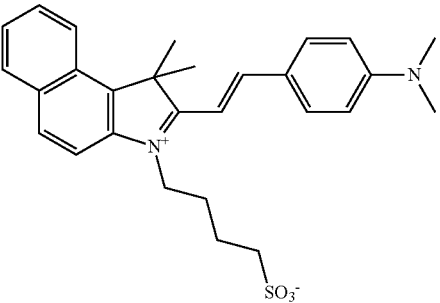<br>(E)-4-(2-(4-(dimethylamino)styryl)-1,1-dimethyl-1H-benzo[e]indol-3-ium-3-yl)butane-1-sulfonate |
| 2 | [Chemical Formula 3]<br>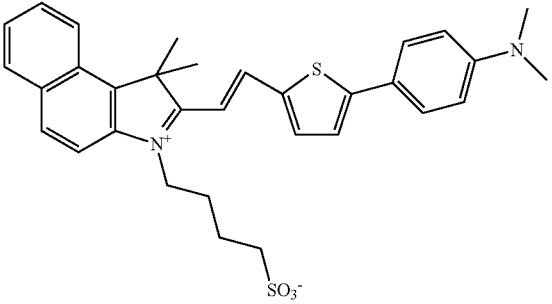<br>(E)-4-(2-(2-(5-(4-(dimethylamino)phenyl)thiophen-2-yl)vinyl)-1,1-dimethyl-1H-benzo[e]indol-3-ium-3-yl)butane-1-sulfonate |
| 3 | [Chemical Formula 4]<br>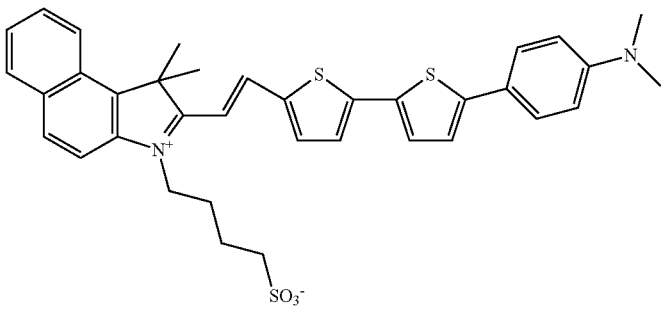<br>(E)-4-(2-(2-(5'-(4-(dimethylamino)phenyl)-[2,2'-bithiophen]-5-yl)vinyl)-1,1-dimethyl-1H-benzo[e]indol-3-ium-3-yl)butane-1-sulfonate |

TABLE 1-continued

| Compound | Chemical structural formula |
|---|---|
| 4 | [Chemical Formula 5]<br />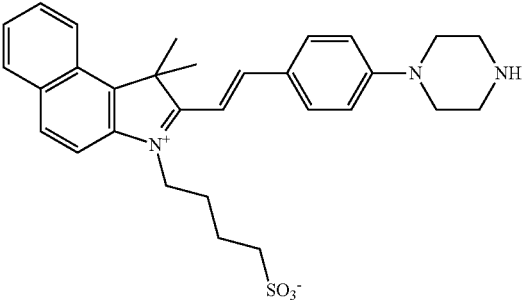<br />(E)-4-(1,1-dimethyl-2-(4-(piperazin-1-yl)styryl)-1H-benzo[e]indol-3-ium-3-yl)butane-1-sulfonate |
| 5 | [Chemical Formula 6]<br />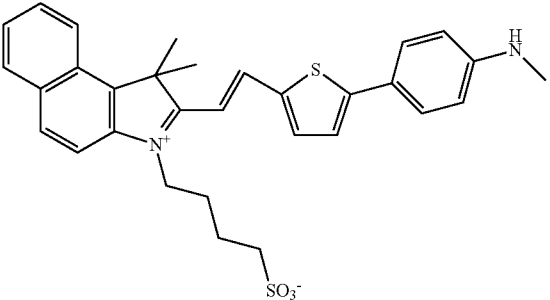<br />(E)-4-(1,1-dimethyl-2-(2-(5-(4-(methylamino)phenyl)thiophen-2-yl)vinyl)-1H-benzo[e]indol-3-ium-3-yl)butane-1-sulfonate |
| 6 | [Chemical Formula 7]<br />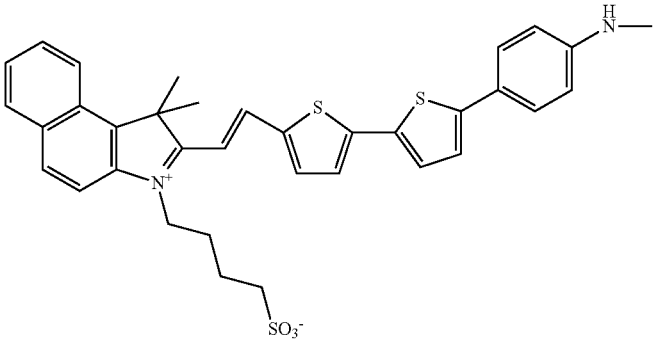<br />(E)-4-(1,1-dimethyl-2-(2-(5'-(4-(methylamino)phenyl)-[2,2'-bithiophen]-5-yl)vinyl)-1H-benzo[e]indol-3-ium-3-yl)butane-1-sulfonate |

The compound represented by Chemical Formula 1 may be used in the form of a pharmaceutically acceptable salt, and the salt may be an acid addition salt formed using a pharmaceutically acceptable free acid. The acid addition salt is obtained from inorganic acids such as hydrochloric acid, nitric acid, phosphoric acid, sulfuric acid, hydrobromic acid, hydroiodic acid, nitrous acid, and phosphorous acid, non-toxic organic acids such as aliphatic mono- and di-carboxylate, phenyl-substituted alkanoate, hydroxy alkanoate and alkandioate, aromatic acids, and aliphatic and aromatic sulfonic acids, and organic acids such as acetic acid, benzoic acid, citric acid, lactic acid, maleic acid, gluconic acid, methanesulfonic acid, 4-toluenesulfonic acid, tartaric acid, and fumaric acid. Examples of such a pharmaceutically non-toxic salt include sulfate, pyrosulfate, bisulfate, sulfite, bisulfite, nitrate, phosphate, monohydrogen phosphate, dihydrogen phosphate, metaphosphate, pyrophosphate chloride, bromide, iodide, fluoride, acetate, propionate, decanoate, caprylate, acrylate, formate, isobutyrate, caprate, heptanoate, propiolate, oxalate, malonate, succinate, suberate, sebacate, fumarate, maleate, butyne-1,4-dioate, hexane-1,6-dioate, benzoate, chlorobenzoate, methyl benzoate, dinitrobenzoate, hydroxy benzoate, methoxy benzoate, phthalate, terephthalate, benzene sulfonate, toluene sulfonate, chlorobenzene sulfonate, xylene sulfonate, phenyl acetate, phenyl propionate, phenyl butyrate, citrate, lactate, β-hydroxy butyrate, glycolate, malate, tartrate, methane sulfonate, propane sulfonate, naphthalene-1-sulfonate, naphthalene-2-sulfonate, and mandelate.

The acid addition salt according to the present invention can be produced by a conventional method, and can be produced, for example, by dissolving the compound represented by Chemical Formula 1 in an organic solvent such as methanol, ethanol, acetone, dichloromethane, or acetonitrile, adding an organic acid or an inorganic acid to form a precipitate, and filtering and drying the precipitate, or by distilling a solvent and an excess of acid under reduced pressure and drying the resultant, and crystallizing the resultant in the organic solvent.

Moreover, a pharmaceutically acceptable metal salt can be made using a base. An alkali metal or alkaline earth metal salt is obtained, for example, by dissolving the compound in an excess of an alkali metal hydroxide or alkaline earth metal hydroxide solution, filtering an undissolved compound salt, and evaporating and drying the filtrate. Here, producing a sodium, potassium, or calcium salt as the metal salt is pharmaceutically suitable. Further, the corresponding salt is obtained by reacting an alkali metal or alkaline earth metal salt with a suitable negative salt (for example, silver nitrate).

Furthermore, the present invention includes not only the compound represented by Chemical Formula 1 and a pharmaceutically acceptable salt thereof, but also a solvate, a hydrate, and the like, which can be produced therefrom.

The composition for the detection of beta-amyloid according to the present invention contains the aforementioned compound or a pharmaceutically acceptable salt thereof.

In the present specification, the "beta-amyloid" refers to 36 to 43 amino acid peptides which are the main components of amyloid plaques found in the brain of a patient with Alzheimer's disease, and critically involved in Alzheimer's disease.

In the present specification, the "beta-amyloid plaque" refers to an aggregated state where various insoluble fibrous proteins are deposited in the tissues of a patient, and the beta-amyloid plaque includes an aggregate formed by aggregating amyloid proteins and/or an amyloid deposit formed by additional combinations of amyloid proteins.

In the present specification, the "beta-amyloid plaque detection" or "diagnosis of a disease caused by beta-amyloid plaque overproduction" is carried out using binding between the beta-amyloid and/or beta-amyloid plaque and the compound represented by Chemical Formula 1 according to the present invention or a pharmaceutically acceptable salt thereof, and the "binding" refers to chemical interactions such as a covalent bond, an ionic bond, a hydrophilic-hydrophilic interaction, a hydrophobic-hydrophobic interaction, and a complex compound bond.

In the present specification, the "disease caused by beta-amyloid plaque overproduction" may include dementia, Alzheimer's disease, Down syndrome, amyloid angiopathy, cerebral amyloid angiopathy, systemic amyloidosis, Dutch-type amyloidosis, inclusion body myositis, Mediterranean fever, Muckle-Wells Syndrome, idiopathic myeloma, amyloid polyneuropathy, amyloid cardiomyopathy, systemic senile amyloidosis, amyloidosis hereditary cerebral hemorrhage, scrapie, Creutzfeldt-Jakob disease, Kuru disease, Gerstmann-Straussler-Scheinker syndrome, medullary thyroid carcinoma, muscular weakness disease, and islet of Langerhans type II diabetes.

In one embodiment, the "composition for detection" may be formulated as an imaging agent, such as a PET imaging agent, an optical imaging agent, which uses light in the visible or near-infrared range generated in a living body as an image signal, or a PET-MRI fusion imaging agent, and then used in a PET imaging method, an optical imaging method, or a PET-MRI fusion imaging method. When the composition is formulated, the composition may further contain a pharmaceutically acceptable carrier, as needed.

The composition for detection according to the present invention can be orally or parenterally administered during clinical administration, and can be used in the form of a typical pharmaceutical formulation. The composition may further contain a pharmaceutically acceptable carrier or additive, and when the composition is formulated, a formulation can be prepared using a filler, an extender, a binder, a wetting agent, a disintegrating agent, a diluent such as a surfactant, or an excipient, which is commonly used.

In one embodiment, the compound exhibits water solubility, and thus the composition may contain water as a solvent. Accordingly, the composition may be formulated as a water-soluble injection, but the present invention is not limited thereto.

The method for detecting beta-amyloid according to the present invention includes a step for mixing the compound according to the present invention or a pharmaceutically acceptable salt thereof with a sample containing beta-amyloid, and a step for measuring a fluorescence signal for the beta-amyloid.

In one embodiment, the present invention provides a method for detecting beta-amyloid through PET imaging, the method including a step for mixing the compound according to the present invention or a pharmaceutically acceptable salt thereof with a sample containing beta-amyloid, and a step for measuring a fluorescence signal for the beta-amyloid.

In another embodiment, the present invention provides a method for detecting beta-amyloid through optical imaging, the method including a step for mixing the compound according to the present invention or a pharmaceutically acceptable salt thereof with a sample containing beta-amyloid, and a step for measuring a fluorescence signal for the beta-amyloid.

In still another embodiment, the present invention provides a method for detecting beta-amyloid through PET-MRI fusion imaging, the method including a step for mixing the compound according to the present invention or a pharmaceutically acceptable salt thereof with a sample containing beta-amyloid, and a step for measuring a fluorescence signal for the beta-amyloid.

Here, the compound represented by Chemical Formula 1 according to the present invention or a pharmaceutically acceptable salt thereof exhibits a high binding affinity for the beta-amyloid and/or beta-amyloid plaque, and forms specific binding.

The step for administering the composition to a subject may be carried out by introducing, into a tissue or subject, a detectable amount of the composition containing the compound according to the present invention or a pharmaceutically acceptable salt thereof. The introduction into the tissue or subject is carried out by a method known to those skilled in the art.

The term "tissue" refers to a part of the body of a subject. Examples of the tissue may include a retina, a blood vessel, a brain, a heart, a liver, and an artery. The "detectable amount" is the amount of a composition required to be detected by the selected detection method. The amount of a composition introduced into a patient for detection can be easily determined by those skilled in the art. For example, the amount of the composition may be increased and administered to the subject until the effective component in the composition is detected by the selected detection method. The term "subject" refers to a human or another animal. Those skilled in the art could easily determine the time required for the compound according to the present invention to bind to an amyloid aggregate by introducing the aforementioned composition into a subject in a detectable amount and then detecting labeled substances at various time points after the administration.

The administration of the composition for detection according to the present invention to a subject may be carried out through a systemic or local administration route. For example, the composition may be administered orally, intrarectally, parenterally (intravenously, intramuscularly, or subcutaneously), intracisternally, intravaginally, intraperitoneally, intravesically, or topically (a powder, an ointment, or a drop), or may be administered by an intrabuccal or intranasal spray. The composition may be administered to a subject so that the composition can migrate through the body. Moreover, the composition may be administered to a specific organ or tissue of interest.

In the method for detecting a beta-amyloid aggregate produced by the administration of the composition for detection, the composition containing the compound according to the present invention or a pharmaceutically acceptable salt thereof is introduced into a subject in a detectable amount, and after the lapse of the time sufficient for the compound to bind to the amyloid aggregate, a fluorescence-labeled substance can be non-invasively detected in the subject. Moreover, a tissue sample is isolated from the subject, the aforementioned composition is introduced into the tissue sample, and after the lapse of the time sufficient for the compound or a pharmaceutically acceptable salt thereof in the composition to bind to the amyloid aggregate, a fluorescence-labeled substance can be detected.

When the composition for detection according to the present invention is used, a useful effect for the detection of beta-amyloid through retinal imaging, which has been recently developed, can be exhibited. Therefore, it is possible to provide an important means for the diagnosis and treatment of a disease caused by beta-amyloid plaque overproduction through retinal imaging, in particular, the early diagnosis and monitoring of Alzheimer's disease.

Hereinafter, the present invention will be described in detail with reference to drawings and Examples.

Example 1. Synthesis of Compound 1

Compound 1: (E)-3-(2-4-(dimethylamino)styryl)-1,1-dimethyl-1H-benzo[e]indol-3-ium-3-yl)butane-1-sulfonate

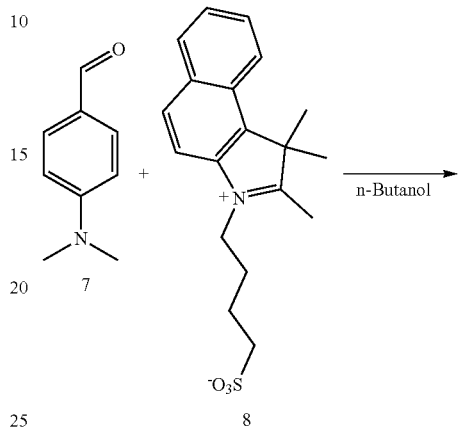

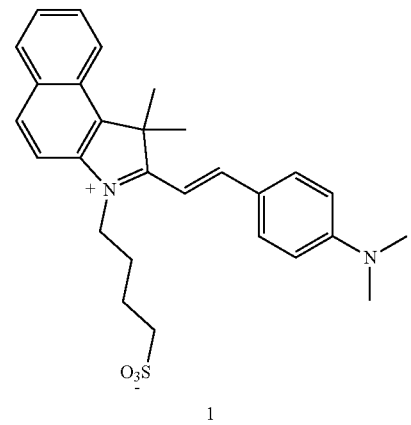

For the synthesis of a Compound 1, a Compound 7 (43 mg, 0.289 mmol) and a Compound 8 (100 mg, 0.289 mmol) were dissolved in butanol, and the resultant was refluxed at 130° C. for 24 hours. The reactant was concentrated under reduced pressure and then separated by chromatography ($CH_2Cl_2$:MeOH=5:1) to synthesize a Compound 1.

$^1$H NMR (500 MHz, MeOH-$d_4$, δ, ppm): 1.80-1.83 (2H, m), 1.93-1.96 (8H, m), 2.51-2.52 (2H, m), 3.13 (6H, s), 4.60-4.63 (2H, m), 6.85 (2H, d, J=9.0 Hz), 7.37 (1H, d, J=15.5 Hz), 7.61 (1H, t, J=7.0 Hz), 7.72 (1H, t, J=7.0 Hz), 7.99 (1H, d, J=8.0 Hz), 8.12 (2H, d, J=8.0 Hz), 8.17 (1H, d, J=9.0 Hz), 8.32 (1H, d, J=8.5 Hz), 8.38 (1H, d, J=15.5 Hz).

Example 2. Synthesis of Compound 2 and Compound 3

Compound 2: (E)-4-(2-(2-(5-(4-(dimethylamino) phenyl)thiophen-2-yl)vinyl)-1,1-dimethyl-1H-benzo [e]indol-3-ium-3-yl)butane-1-sulfonate Compound 3: (E)-4-(2-(2-(5'-(4-(dimethylamino) phenyl)-[2,2'-bithiophen]-5-yl)vinyl)-1,1-dimethyl-1H-benzo[e]indol-3-ium-3-yl)butane-1-sulfonate

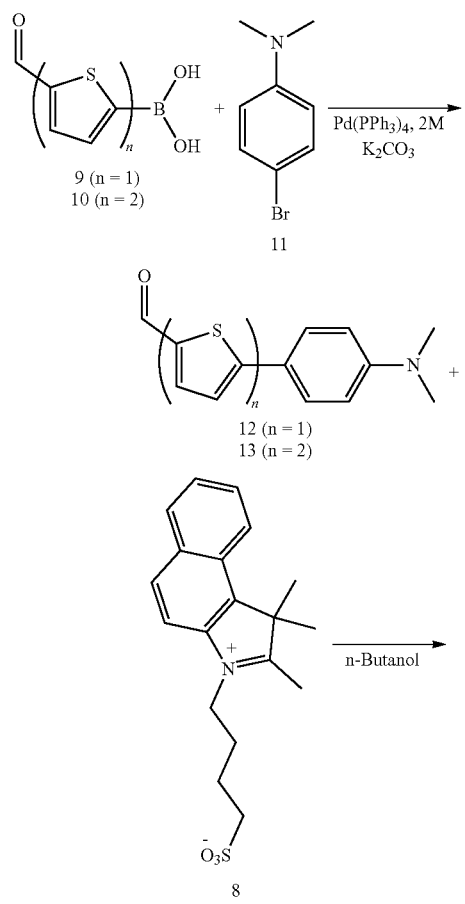

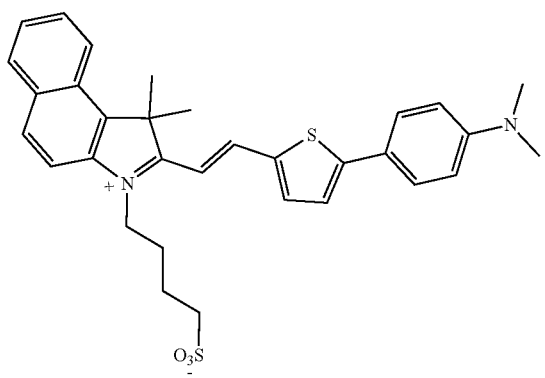

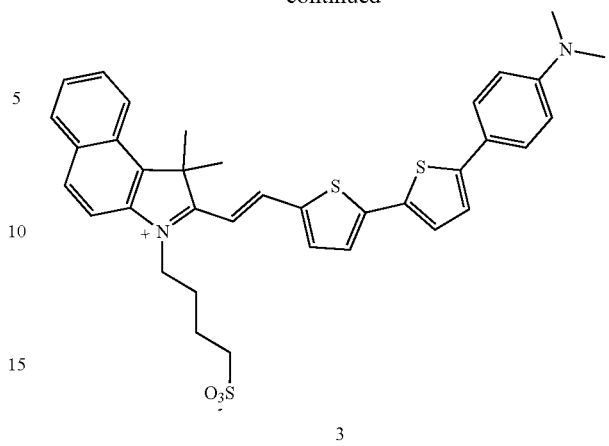

A Compound 11 (167 mg, 0.7 mmol) and Pd(PPh$_3$)$_4$ (80 mg, 0.07 mmol) were dissolved in toluene (10 ml). A Compound 9 or 10 (0.7 mmol) was dissolved in EtOH (8 mL), and the resultant was added to the mixture. Moreover, 2 M K$_2$CO$_3$ (2 mL) was added, and the resultant was refluxed at 120° C. for 5 hours and then concentrated under reduced pressure. The produced mixture was separated by chromatography (hexane:ethyl acetate=4:1) to synthesize a Compound 12 or 13.

The Compound 12 or 13 (0.289 mmol) and the Compound 8 (100 mg, 0.289 mmol) were dissolved in butanol, and the resultant was refluxed at 130° C. for 24 hours. The reactant was concentrated under reduced pressure and then separated by chromatography (CH$_2$Cl$_2$:MeOH=5:1) to synthesize a Compound 2 or 3.

m

Compound 2: $^1$H NMR (500 MHz, MeOH-d$_4$, δ, ppm): 2.04-20.9 (8H, m), 2.18-2.19 (2H, m), 2.93-2.96 (2H, m), 3.06 (6H, s), 4.64-4.67 (2H, m), 6.80 (2H, d, J=8.5 Hz), 7.13 (1H, d, J=15.5 Hz), 7.63 (1H, t, J=4.0 Hz), 7.70-7.76 (3H, m), 7.92 (1H, d, J=8.5 Hz), 7.96 (1H, d, J=4.0 Hz), 8.09 (1H, d, J=8.5 Hz), 8.17 (1H, d, J=9.5 Hz), 8.35 (1H, d, J=8.0 Hz), 8.65 (1H, d, J=15.5 Hz)

Compound 3: $^1$H NMR (500 MHz, DMSO-d$_6$, δ, ppm): 1.81-1.84 (2H, m), 2.0-2.01 (8H, m), 2.54-2.57 (2H, m), 2.97 (6H, s), 4.72-4.75 (2H, m), 6.78 (2H, d, J=9.0 Hz), 7.35 (1H, d, J=15.8 Hz), 7.42 (1H, d, J=3.9 Hz) 7.55 (2H, d, J=8.9 Hz), 7.62-7.64 (2H, m), 7.67-7.71 (1H, m), 7.77-7.80 (1H, m), 8.12 (1H, d, J=9.0 Hz), 8.19 (1H, d, J=8.1 Hz), 8.23-8.26 (2H, m), 8.40 (1H, d, J=8.1 Hz), 8.72 (1H, d, J=15.7 Hz)

Example 3. Synthesis of Compound 4

Compound 4: (E)-4-(1,1-dimethyl-2-(4-(piperazin-1-yl)styryl)-1H-benzo[e]indol-3-ium-3-yl)butane-1-sulfonate

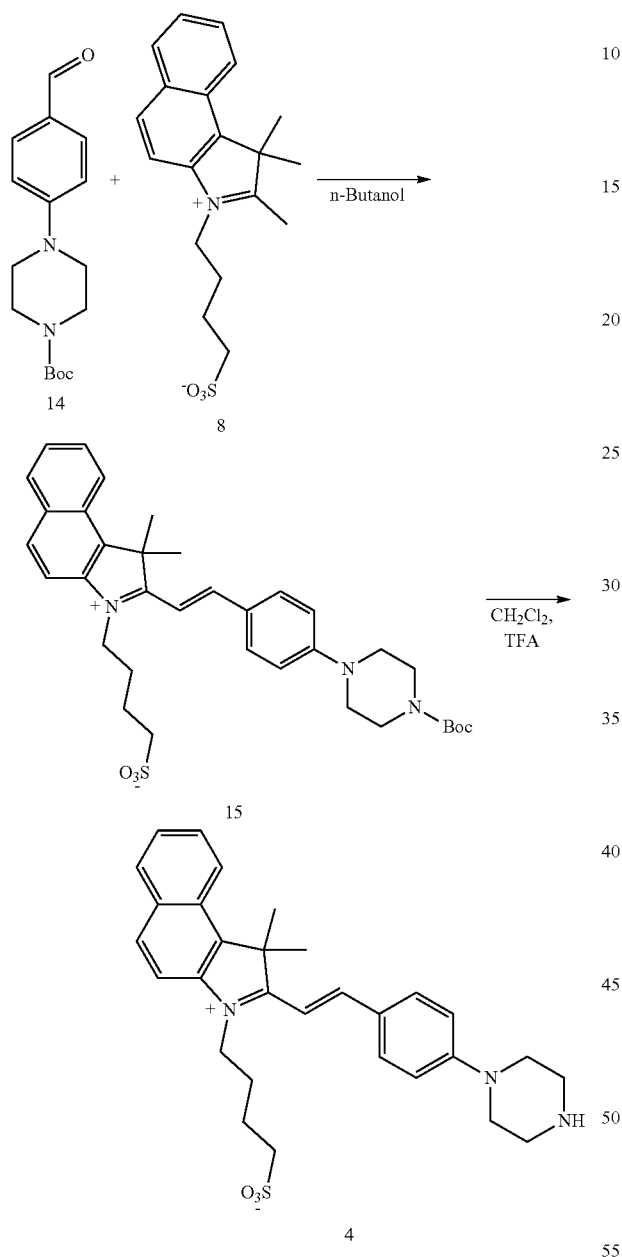

A Compound 14 (84 mg, 0.289 mmol) and the Compound 8 (100 mg, 0.289 mmol) were dissolved in butanol, and the resultant was refluxed at 130° C. for 24 hours. The reactant was concentrated under reduced pressure and then separated by chromatography (CH$_2$Cl$_2$:MeOH=5:1) to synthesize a Compound 15. The Compound 15 was dissolved in CH$_2$Cl$_2$, TFA was added, and the resultant was then stirred at room temperature for 12 hours to obtain a Compound 4.

$^1$H NMR (500 MHz, MeOH-d$_4$, δ, ppm): 1.82-1.83 (2H, m), 1.97-1.99 (8H, m), 2.53-2.54 (2H, m), 3.22-3.24 (2H, m), 3.69-3.71 (2H, m), 4.69-4.72 (2H, m), 7.12 (2H, d, J=9.0 Hz), 7.53 (1H, d, J=15.5 Hz), 7.65 (1H, t, J=7.0 Hz), 7.75 (1H, t, J=7.0 Hz), 8.05 (1H, d, J=8.0 Hz), 8.15-8.22 (4H, m), 8.35 (1H, d, J=8.5 Hz), 8.43 (1H, d, J=15.5 Hz).

Example 4. Synthesis of Compound 5 and Compound 6

Compound 5: (E)-4-(1,1-dimethyl-2-(2-(5-(4-(methylamino)phenyl)thiophen-2-yl)vinyl)-1H-benzo[e]indol-3-ium-3-yl)butane-1-sulfonate Compound 6: (E)-4-(1,1-dimethyl-2-(2-(5'-(4-(methylamino)phenyl)-[2,2'-bithiophen]-5-yl)vinyl)-1H-benzo[e]indol-3-ium-3-yl)butane-1-sulfonate

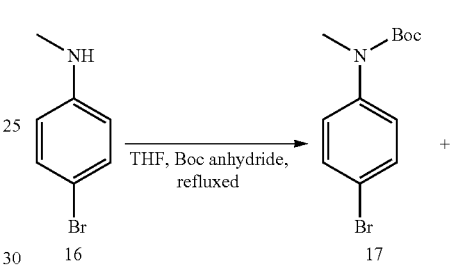

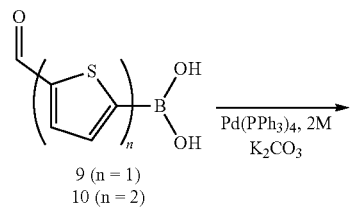

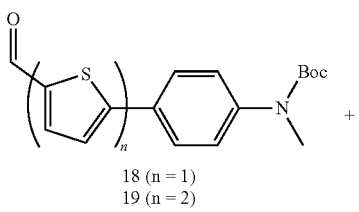

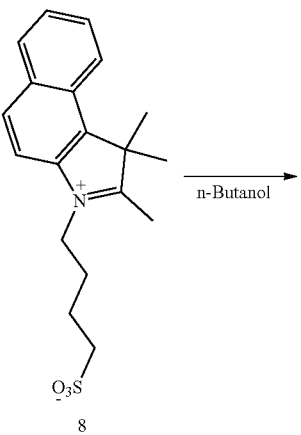

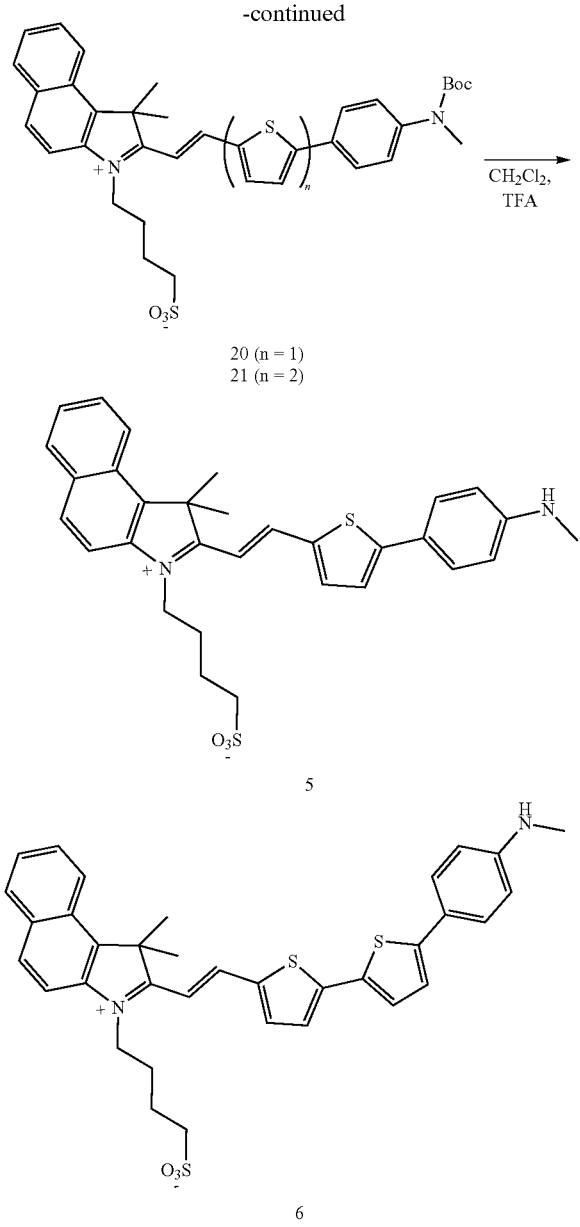

20 (n = 1)
21 (n = 2)

5

6

A Compound 16 (1 g, 5.43 mmol) was dissolved in THF, and Boc anhydride (2.36 g, 10.86 mmol) was added. The mixture was refluxed at 80° C. for 12 hours and then concentrated under reduced pressure. The mixture was separated by chromatography (hexane:ethyl acetate=9:1) to synthesize a Compound 17.

The Compound 17 (200 mg, 0.7 mmol) and Pd(PPh$_3$)$_4$ (80 mg, 0.07 mmol) were dissolved in toluene (10 ml). The Compound 9 or 10 (0.7 mmol) was dissolved in EtOH (8 mL), and the resultant was added to the mixture. Moreover, 2 M K$_2$CO$_3$ (2 mL) was added, and the resultant was refluxed at 120° C. for 5 hours and then concentrated under reduced pressure. The produced mixture was separated by chromatography (hexane:ethyl acetate=4:1) to synthesize a Compound 18 or 19.

The Compound 18 or Compound 19 (0.289 mmol) and the Compound 8 (100 mg, 0.289 mmol) were dissolved in butanol, and the resultant was refluxed at 130° C. for 24 hours. The reactant was concentrated under reduced pressure and then separated by chromatography (CH$_2$Cl$_2$: MeOH=5:1) to synthesize a Compound 20 or Compound 21. The Compound 20 or Compound 21 was dissolved in CH$_2$Cl$_2$, TFA was added, and the resultant was then stirred at room temperature for 12 hours to obtain a Compound 5 or 6.

Compound 5: $^1$H NMR (500 MHz, MeOH-d$_4$, δ, ppm): 2.01-2.05 (8H, m), 2.16-2.19 (2H, m), 2.93-2.96 (2H, m), 3.29 (3H, s), 4.64-4.67 (2H, m), 6.85 (2H, d, J=8.5 Hz), 7.15 (1H, d, J=15.5 Hz), 7.53 (1H, d, J=4.0 Hz), 7.63 (1H, t, J=7.5 Hz), 7.71-7.76 (3H, m), 7.92 (1H, d, J=8.5 Hz), 7.96 (1H, d, J=4.0 Hz), 8.09 (1H, d, J=8.5 Hz), 8.15 (1H, d, J=9.5 Hz), 8.35 (1H, d, J=8.0 Hz), 8.62 (1H, d, J=15.5 Hz)

Compound 6: $^1$H NMR (500 MHz, DMSO-d$_6$, δ, ppm): 1.81-1.83 (2H, m), 2.0-2.01 (8H, m), 2.54-2.57 (2H, m), 2.96 (3H, s), 4.71-4.73 (2H, m), 6.77 (2H, d, J=9.0 Hz), 7.34 (1H, d, J=15.8 Hz), 7.41 (1H, d, J=3.9 Hz) 7.52 (2H, d, J=8.9 Hz), 7.61-7.63 (2H, m), 7.67-7.71 (1H, m), 7.78-7.80 (1H, m), 8.11 (1H, d, J=9.0 Hz), 8.18 (1H, d, J=8.1 Hz), 8.24-8.27 (2H, m), 8.41 (1H, d, J=8.1 Hz), 8.72 (1H, d, J=15.7 Hz)

Experimental Example 1. Measurement of Absorbance of Compound

The maximum excitation and emission wavelengths $λ_{max}$ of the Compounds 1, 2, 4, and 5 according to the present invention were measured by SpectraMax M2 (molecular devices). 10 μM of Ab42 fibrils and 5 μM of each compound, produced by the aforementioned method, as final concentrations were used in a PBS buffer solution. In general, the excitation $λ_{max}$ is determined by scanning the fixed first emission, and the emission $λ_{max}$ is determined by scanning the excitation spectrum with the fixed $λ_{max}$.

Figure 2:
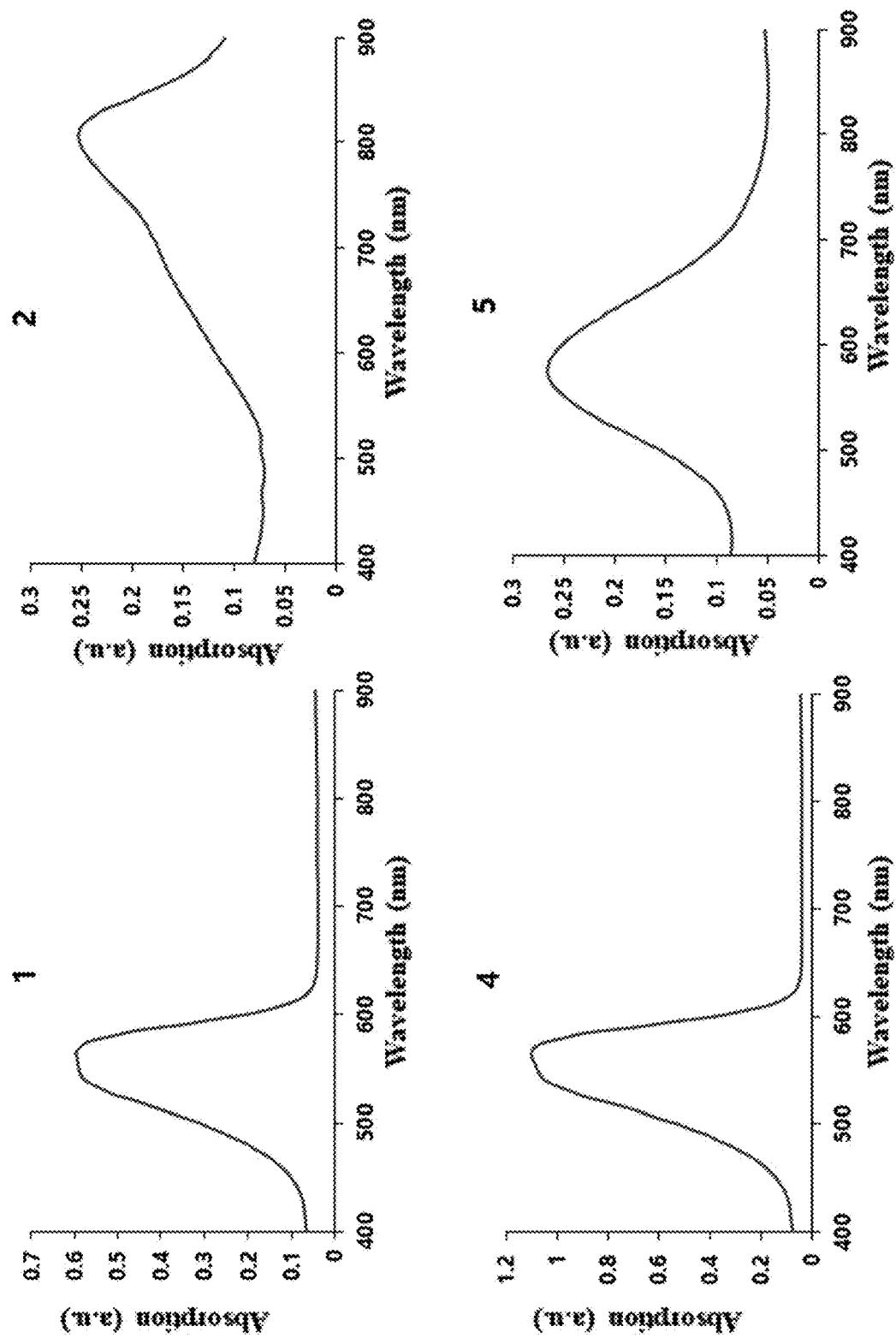
FIG. 2 shows the results of measuring absorbances of a Compound 1, a Compound 2, a Compound 4, and a Compound 5 according to one embodiment.

The absorbance of each of the Compound 1, Compound 2, Compound 4, and Compound 5 synthesized above was measured, and the results thereof are shown in FIG. 2.

Experimental Example 2. Evaluation of Activity after Binding to Beta-Amyloid

Figure 3:
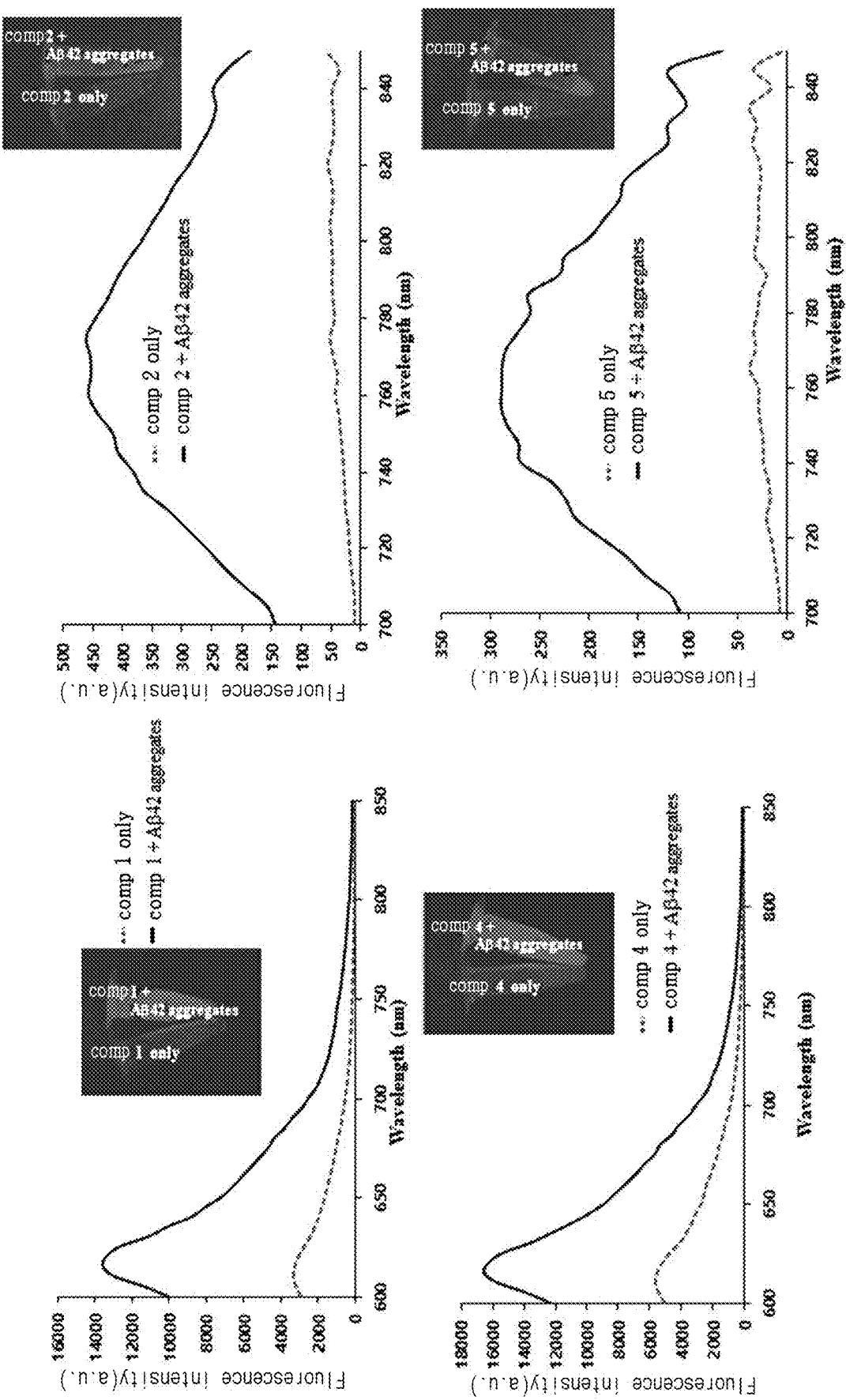
FIG. 3 shows the fluorescence spectrum of the Compound 1, the Compound 2, the Compound 4, and the Compound 5 according to one embodiment, before and after binding to beta-amyloid.

Regarding each of the Compound 1, Compound 2, Compound 4, and Compound 5 synthesized above, the activity before and after binding to beta-amyloid was evaluated, and the results thereof are shown in FIG. 3. In the each rectangular box of the right-upper side in FIG. 3, the case of one of the Compound 1, Compound 2, Compound 4, and Compound 5 (before binding) showed the region of darker gray color, while the case of one of the Compound 1, Compound 2, Compound 4, and Compound 5 (after binding to beta-amyloid: "Aβ42 aggregate") showed the region of lighter gray color (These gray color correspond to red-like color in the real fluorescence image).

Moreover, the absorption wavelengths of each of the Compound 1, Compound 2, Compound 4, and Compound 5 before and after binding to beta-amyloid are shown in Table 2 below. As can be seen in Table 2 below, it was confirmed that when the compound according to the present invention bound to beta-amyloid, the fluorescence intensity was significantly increased. In particular, regarding the fluorescence reactivity to the Aβ peptide, the Faβ/F0 values of the Compounds 1, 2, 4, and 5 were 4.3, 11.6, 3.1, and 9.6, respectively, indicating high fluorescence properties (see Table 2 below).

Furthermore, from FIG. 3, it was confirmed that there was a clear difference in the emission wavelength before and after the compound according to the present invention bound to the amyloid plaque.

TABLE 2

| Fluorescence Properties | Compound 1 | Compound 2 | Compound 4 | Compound 5 |
|---|---|---|---|---|
| $\lambda_{ex}$ (nm) | 560 nm | 805 nm | 570 nm | 575 nm |
| $\lambda_{em}$ (nm) | 620 nm | 765 nm | 620 nm | 760 nm |
| Change in fluorescence intensity after binding to beta-amyloid (fold) | 4.3 | 11.6 | 3.1 | 9.6 |

Experimental Example 3. Retina-Targeting Experiment in Laboratory Mouse

Figure 4:
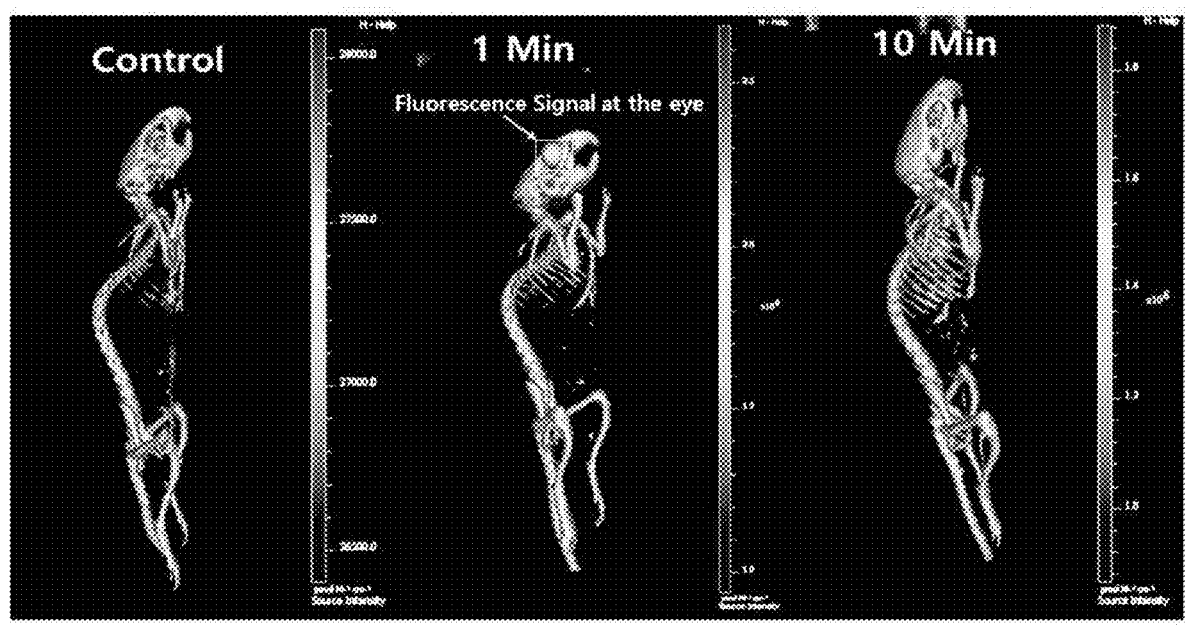
FIG. 4 shows a retinal imaging experiment using the Compound 1 according to Example 1.

A water-soluble Compound 1 (8 mg/kg) was injected into the tail vein of a 3-month-old nude mouse, and imaging was carried out with an IVIS spectrum CT system device, and the results thereof are shown in FIG. 4.

As shown in FIG. 4, a strong fluorescence signal of the water-soluble Compound 1 was detected in the eye of mouse 1 minute after intravenous injection into the nude mouse. Whereas no fluorescence signal was detected in case of "control" (no addition of any compound for the detection of beta-amyloid) and a weak fluorescence signal of water-soluble the Compound 1 was detected in the eye of mouse 10 minutes after the intravenous injection (the enough period for excretion).

This result suggests the possibility that the water-soluble Compound 1 can be used in the diagnosis of a disease caused by abnormal deposition of amyloid proteins, such as Alzheimer's disease, through retinal imaging.

The invention claimed is:

1. A method for detecting the presence of beta-amyloid plaque in a sample, the method comprising:
    contacting the sample with a compound represented by Chemical Formula 1 or a pharmaceutically acceptable salt thereof; and
    measuring an increase or shift in a fluorescence signal generated by the compound of Chemical Formula 1 upon binding to the beta-amyloid plaque:

[Chemical Formula 1]

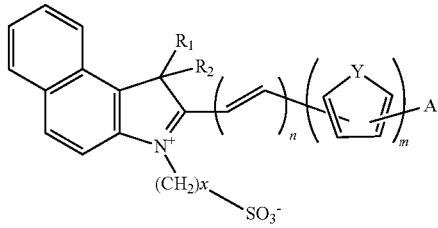

in Chemical Formula 1,
Y is S or O,
A is phenylpiperazine, N-methylaniline or N,N-dimethylaniline,
$R_1$ and $R_2$ are each independently hydrogen or a $C_1$ to $C_{10}$ alkyl group,
x is an integer of 1 to 10, and
n and m are each independently an integer of 0 or greater, and n+m≥1,
wherein the increase or shift in the fluorescence signal, as compared to a fluorescence of the compound in the absence of beta-amyloid plaque, indicates the presence of beta-amyloid plaque in the sample.

2. The method for detecting the presence of beta-amyloid plaque of claim 1, wherein the method is for providing the information about the increase or shift in the fluorescence signal for the diagnosis of a disease caused by beta-amyloid plaque overproduction.

3. The method for detecting the presence of beta-amyloid plaque of claim 2, wherein the disease caused by beta-amyloid plaque overproduction is a disease selected from the group consisting of dementia, Alzheimer's disease, Down syndrome, amyloid angiopathy, cerebral amyloid angiopathy, systemic amyloidosis, Dutch-type amyloidosis, inclusion body myositis, Mediterranean fever, Muckle-Wells Syndrome, idiopathic myeloma, amyloid polyneuropathy, amyloid cardiomyopathy, systemic senile amyloidosis, amyloidosis hereditary cerebral hemorrhage, scrapie, Creutzfeldt-Jakob disease, Kuru disease, Gerstmann-Straussler-Scheinker syndrome, medullary thyroid carcinoma, muscular weakness disease, and islet of Langerhans type II diabetes.

4. The method for detecting the presence of beta-amyloid plaque of claim 1, wherein n and m are each independently an integer of 0 to 10.

5. The method for detecting the presence of beta-amyloid plaque of claim 1, wherein $R_1$ and $R_2$ are each a methyl group.

6. The method for detecting the presence of beta-amyloid plaque of claim 1, wherein x is 4.

7. The method for detecting the presence of beta-amyloid plaque of claim 1,
    in Chemical Formula 1,
    Y is S,
    A is phenylpiperazine, N-methylaniline or N,N-dimethylaniline,
    $R_1$ and $R_2$ are each a methyl group,
    x is 4,
    n is 1, and
    m is 0 or 1.

8. The method for detecting the presence of beta-amyloid plaque of claim 1, wherein the compound represented by Chemical Formula 1 is at least one selected from the group consisting of (E)-3-(2-4-(dimethylamino)styryl)-1,1-dimethyl-1H-benzo[e]indol-3-ium-3-yl)butane-1-sulfonate, (E)-4-(2-(2-(5-(4-(dimethylamino)phenyl)thiophen-2-yl)vinyl)-1,1-dimethyl-1H-benzo[e]indol-3-ium-3-yl)butane-1-sulfonate, (E)-4-(1,1-dimethyl-2-(4-(piperazin-1-yl)styryl)-1H-benzo[e]indol-3-ium-3-yl)butane-1-sulfonate, and (E)-4-(1,1-dimethyl-2-(2-(5-(4-(methylamino)phenyl)thiophen-2-yl)vinyl)-1H-benzo[e]indol-3-ium-3-yl)butane-1-sulfonate.

* * * * *